Sept. 13, 1966 J. G. PEEBLES 3,272,927

TELEPHONE STERILIZING ATTACHMENT

Filed Sept. 3, 1963

INVENTOR
John G. Peebles

BY Clive H. Bramson

ATTORNEY 3,272,927
TELEPHONE STERILIZING ATTACHMENT
John G. Peebles, 117 Charles St., New York, N.Y.
Filed Sept. 3, 1963, Ser. No. 306,248
9 Claims. (Cl. 179—185)

This invention relates generally to attachments for transmitter-receiver telephones and more particularly to a sterilizing attachment therefor, whereby the mouthpiece and/or earpiece may be continually exposed to germicidal rays emitted by an ultra-violet lamp preferably of the bulb type or other like or suitable type.

Whereas infectious, contagious germs are directly deposited upon the transmitting portion of a telephone instrument by the mere act of speaking thereinto, the present invention is concerned with the immediate and continual destruction of such germs by the bombardment thereof with the germicidal rays emitted by an ultra-violet light producing lamp.

Consonant with the foregoing the instant invention has for an object the provision of a telephone sterilizing attachment adapted to receive a germicidal lamp of the conventional bulb type arranged in continually closed circuit for sterilization of the mouthpiece apertures whether or not the telephone is in use.

Another object of the present invention is to provide a device of the instant character whereby those portions of the mouthpiece of a telephone incapable of being wiped clean may be sterilized while any deleterious effects of the germicidal ultra-violet light with respect to the user are minimized.

A further object of this invention resides in the provision of a sterilizing attachment capable of selective use as a night light and/or as a light source in illuminating the dial of the telephone.

Another object of the present invention is to provide a device in accordance with the foregoing which will readily replace the ordinary mouthpiece or earpiece portions of a telephone instrument without the use of tools or special equipment.

Another general object of the present invention is to provide a device of the described character which will be simple in structure, economical of manufacture, easily and quickly installed and highly effective in use.

Other objects and advantages of the instant telephone sterilizing attachment will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

Figure 2:
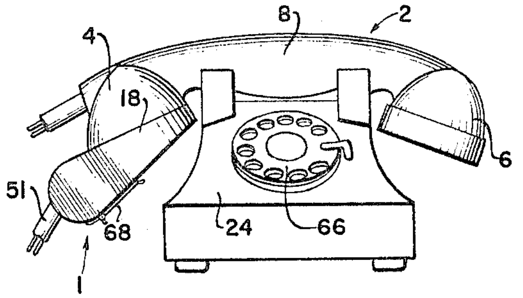
FIGURE 2 is a side elevational view of the telephone instrument shown in FIGURE 1 cradled within the base portion of a telephone set.
Figure 1:
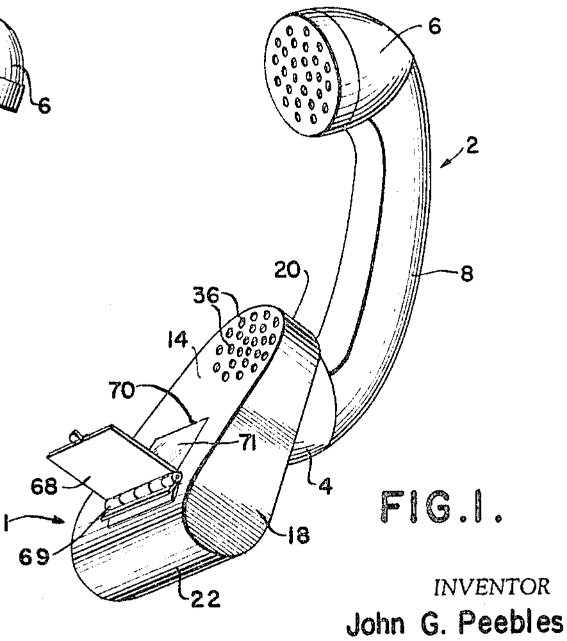
FIGURE 1 is a perspective view of the telephone sterilizing attachment secured to a telephone instrument in place of the mouthpiece thereof.

Referring now in detail to the present preferred embodiment of the invention illustrated in the accompanying drawings, FIGURES 1 and 2 show the telephone sterilizing attachment designated generally by numeral 1 connected to a telephone instrument 2, the latter having transmitting and receiving portions 4 and 6, respectively, and handle 8 disposed integrally therebetween.

It will be appreciated that a mouthpiece, not shown in the drawings, is ordinarily screwed to the face of said transmitting portion 4 and contains the usual voice pickup member; the instant attachment being shown attached to said transmitting portion in lieu of the mouthpiece, the usual voice pickup member, although not shown being understood to be receivable within said instant attachment.

Figure 5:
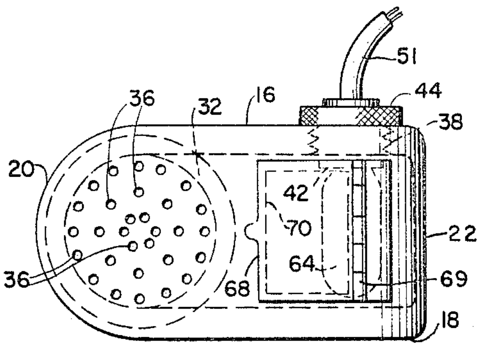
FIGURE 5 is a plan view of the device taken along line 5—5 of FIGURE 3.
Figure 4:
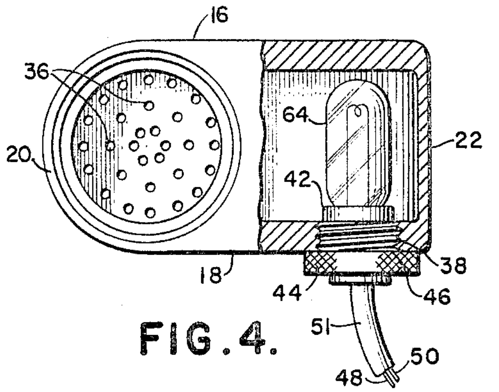
FIGURE 4 is a plan view of the telephone sterilizing attachment taken along line 4—4 of FIGURE 3, a fragmentary portion thereof being shown in cross-section.
Figure 3:
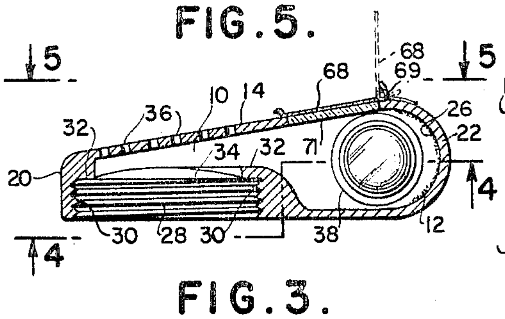
FIGURE 3 is a cross-sectional side elevational view of the attachment.

With reference now to FIGURES 3, 4 and 5 it will be observed that the telephone sterilizing attachment is comprised of an elongated hollow casing having obverse and reverse surfaces 12 and 14, respectively, side walls 16 and 18 and arcuate end walls 20 and 22, the latter being uniformly concave with respect to the interior 10 of said casing. It will be further seen that surfaces 12 and 14 are angularly disposed in converging relation from said end wall 22 to said end wall 20 such configuration being preferable in view of the conventional facing attitude of the transmitting portion 4 with respect to base portion 24 of the telephone set and particularly in view of the minimum of space therebetween.

Reflective material 26 is superposed with respect to the concave surface of end wall 22, the purpose thereof being to effectively direct the ultra-violet or germicidal light toward end wall 20 as will be described hereinbelow following.

Circular recess 28 is provided within obverse surface 12 adjacent end wall 20 of said casing, said recess being annularly threaded about internal wall 30 thereof. Annular shoulder 32, positioned at the inner end 34 of said recess provides a seat for a voice pickup member utilized with conventional telephone instruments and receivable within said recess, the latter being threadedly securable to the external annular thread of the transmitting portion 4, said external annular thread being exposed upon removal of the mouthpiece originally secured thereto, thus enabling convenient securement of the instant telephone sterilizing attachment to the transmitting portion.

It will be understood that the attachment according to this invention is also securable to the receiving portion of the telephone instrument in the same manner as described with respect to securement thereof to the transmitting portion although sterilization of the transmitting portion is most often to be desired.

Apertures 36, provided through surface 14 of said hollow casing are opposingly disposed with respect to said recess 28 and in communication therewith. Accordingly, voice vibrations passing through said apertures will impinge upon a voice pickup member receivable within recess 28 and be transmitted in accordance with known principles.

Figure 6:
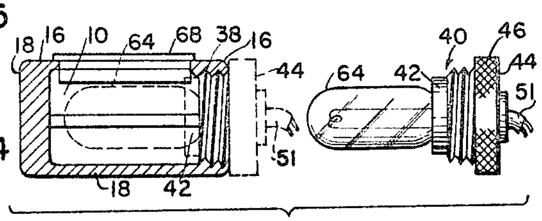
FIGURE 6 is a side elevational view of the lamp socket and germicidal lamp illustrating the removable relation of the hollow casing therewith.

A passage 38 is provided through side wall 16 of said hollow casing adjacently of arcuate end wall 22, the inner surface of which is uniformly concave and superposed with reflective material 26 is aforementioned. Said passage is annularly threaded internally thereof as shown in FIGURES 4, 5 and 6 of the drawings and is adapted to threadedly receive lamp socket 40, whereby the lamp receiving end 42 thereof is adapted for disposition within the hollow interior 10 of said casing. FIGURE 6 discloses said lamp socket threadedly received within said passage, such representation being in broken line designation, the withdrawn lamp socket being also shown in said figure and shown therein in full line designation. The opposite end 44 of said lamp socket 40 extends outwardly of side wall 16 when said lamp socket is secured within said passage, knurled peripheral portion 46 thereof being provided to permit manual insertion and removal of said lamp socket with respect to said hollow casing. Leads 48, 50, insulated within cord 51, extend into the lamp socket through end 44 thereof and provide electrical energy to contacts 52, 54 provided within lamp receiving end 42 of said lamp socket.

Figure 7:
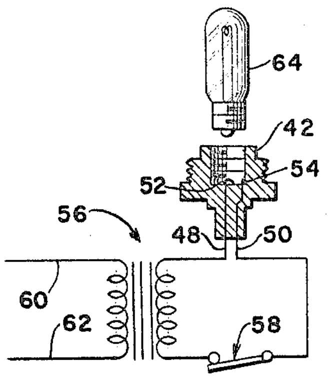
FIGURE 7 is a wiring diagram of the device.

Referring to FIGURE 7, the leads 48, 50 extend to one winding of a transformer 56, through switch 58 shown in closed position in said figure; from the other winding of which extends the leads 60, 62 to a conventional source of electrical power. The transformer may be mounted in a suitable housing, which may be secured to a suitable support in an inconspicuous location adjacent the telephone.

Conventionally shaped bulb-type germicidal lamp 64 is preferably filled with any of the various gaseous mixtures which will emit ultra-violet radiations of value sufficient to provide a sterilizing effect upon adjacent surfaces to which the radiations are directed, it being well known that mixtures such as mercury vapor and argon, or neon and mercury vapor, will be capable of being satisfactorily employed for the intended purpose. As seen in the drawings, said ultra-violet light emitting lamp is threadedly receivable within said lamp socket 40 for contacting engagement with wire leads 48, 50. It will be appreciated that means other than screwing said lamp into the socket falls within the contemplation of this invention, as, e.g., bayonet or other suitable securing means.

While the germicidal effect of the ultra-violet light emitted from lamp 64 is of primary importance, the instant invention manifests the additional attributes of functioning as a night light and/or as means for illuminating dial 66 during the dialing operation. To these ends opaque door 68 is preferably secured by hinge 69 over glass covered opening 70 provided within surface 14 of said hollow casing to thereby enable selective concealment or exposure of said glass covered opening 70, said opening being disposed adjacently of end wall 22. Other suitable door securing means may be utilized. Accordingly, then, illuminating light rays will be emitted through glass covered opening 70 when door 68 is in the open position as shown in FIGURE 1 or in FIGURE 3, such position in the latter figure being in broken line designation; it being appreciated, however, that glass cover 71 will at all times preclude emission of the harmful rays against the user. The ultra-violet lamp will, however, continue to bombard apertures 36 with its germicidal rays to thereby destroy deleterious germs continually as they are deposited within said apertures, disinfecting or washing thereof being otherwise difficult to accomplish. Reflective material 26 which may be aluminum foil or other suitable material functions to concentrate the germicidal rays in the vicinity of said apertures and also upon the voice pickup member which is commonly contained within the recess 28 of the attachment according to the present invention.

It will be appreciated that ultra-violet rays egressing from apertures 36 will be minimal and hence no harmful effect will be realized therefrom.

Although the preferred embodiment of the telephone sterilizing attachment structure has been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. An attachment for a telephone instrument having transmitting and receiving portions disposed at opposing ends of said instrument, respectively, and including a handle disposed intermediate said portions, comprised of an elongate hollow casing having obverse and reverse surfaces and side and end walls, a circular recess within the obverse surface of said casing and adjacent one end wall thereof, said recess being annularly threaded internally thereof, said reverse surface having a plurality of apertures therethrough, said apertures being opposingly disposed with respect to said recess and in communication therewith, a passage provided through one of said side walls of said casing and adjacent the other end wall thereof, said passage being annularly threaded internally thereof, a lamp socket threadedly receivable within said passage, said socket having a lamp receiving end adapted for disposition within said hollow casing and an opposite end adapted to extend outwardly of said one said side wall, said opposite end being knurled peripherally thereof, and wire leads extending into said socket through the opposite end thereof for providing electrical energy to said lamp receiving end, a door hingedly secured to said reverse surface and adapted to enable selective concealment or exposure of an opening provided through said reverse surface adjacently said other end wall, and an ultra-violet light emitting lamp receivable within said socket for contacting engagement with said wire leads, said circular recess being threadedly receivable upon either said transmitting or receiving portions of the telephone instrument.

2. An attachment for a telephone instrument having transmitting and receiving portions disposed at opposing ends of said instrument, respectively, and including handle means disposed intermediate said portions, comprised of a hollow casing having obverse and reverse surfaces and side and end walls, a circular recess within the obverse surface of said casing, the voice pickup member of said telephone instrument being receivable within said recess, said recess being securable over the transmitting portion of said instrument, said reverse surface having a plurality of apertures disposed therethrough, said apertures being opposingly disposed with respect to said recess and in communication therewith, a passage provided through one of said side walls of said casing, a lamp socket removably securable within said passage, said socket having a lamp receiving end adapted for disposition within said casing, means for connecting said lamp socket to an external electrical power source, a door hingedly secured to said reverse surface and adapted to enable selective concealment or exposure of an opening provided through said reverse surface, and an ultra-violet light emitting lamp receivable within said socket, light emitted by said lamp being incident with respect to said apertures and said opening.

3. An attachment for a telephone instrument having transmitting and receiving portions, comprised of a hollow casing including means for connecting said casing to either said transmitting and receiving portions, a germicidal lamp extending within said casing, one surface of said casing having an opening therein for emitting light emanating from said lamp, closure means removably associated with said opening to thereby enable selective exposure or closure of said opening, said casing being provided with a plurality of apertures disposed through said one surface, said apertures being positioned opposite said means for connecting said casing, light emitted by said lamp being incident with respect to said apertures and said opening.

4. An attachment for a telephone instrument having transmitting and receiving portions, comprised of a hollow casing having obverse and reverse surfaces and side and end walls, a circular recess within the obverse surface of said casing, said recess being internally threaded, there being an annular shoulder at one end thereof, the voice pickup member of said telephone instrument being receivable within said recess and in seating engagement with said shoulder thereof, said recess being securable over the transmitting portion of said instrument, said reverse surface having a plurality of apertures disposed therethrough, said apertures being opposingly disposed with respect to said recess and in communication therewith, a passage provided through one of said side walls of said casing, a lamp socket removably securable within said passage, said socket having a lamp receiving end adapted for disposition within said casing, means for connecting said lamp socket to an external electrical power source, a germicidal lamp within said socket, said lamp extending within said casing, the reverse surface of said casing having an opening therethrough for emitting light emanating from said lamp, closure means removably associated with said opening to thereby enable selective exposure or closure of said opening, light emitted by said lamp being incident with respect to said aperture and said opening.

5. An attachment for a telephone instrument having transmitting and receiving portions, comprised of a hollow casing having obverse and reverse surfaces and side and end walls, one end wall being uniformly concave with respect to the interior of said casing, said surfaces being angularly disposed in converging relation from said uniformly concave end wall to the other end wall, reflective material superposed with respect to said uniformly concave end wall, a circular recess within the obverse surface of said casing and adjacent to the other end wall, said recess being annularly threaded internally thereof, said reverse surface having a plurality of apertures provided therethrough, said apertures being opposingly disposed with respect to said recess and in communication therewith, a passage provided through one of said side walls of said casing and adjacent the uniformly concave end wall, a lamp socket removably secured within said passage, said socket having a lamp receiving end adapted for disposition within said casing, a germicidal lamp within said socket, means for connecting said lamp socket to an external electrical power source, the reverse surface of said casing having an opening therethrough for emitting light emanating from said lamp, closure means removably associated with said opening to thereby enable selective exposure or closure of said opening, light emitted by said lamp being incident with respect to said apertures and said opening.

6. An attachment for a telephone instrument having transmitting and receiving portions, comprised of a hollow casing including means for connecting said casing to said transmitting portion, a filament type germicidal lamp extending within said casing, reflective material within said casing adjacent said germicidal lamp, said casing being provided with a plurality of apertures disposed through one surface of said casing, said apertures being positioned opposite said means for connecting said casing, light emitted by said lamp being incident with respect to said apertures.

7. An attachment for a telephone instrument as set forth in claim 6, wherein said means for connecting said casing to said transmitting portion comprises a circular recess within the other surface of said casing, said recess being annularly threaded internally thereof.

8. An attachment for a telephone instrument having transmitting and receiving portions, comprised of a hollow casing including means for connecting said casing to said transmitting portion, said casing being provided with an opening through one surface thereof, transparent cover means sealing said opening, said casing being further provided with a plurality of apertures disposed through one surface of said casing, said apertures being positioned opposite said means for connecting said casing, a filament type germicidal lamp extending into said casing, means for energizing said filament lamp, light emitted by said lamp being incident with respect to said apertures and said opening.

9. An attachment for a telephone instrument as set forth in claim 8, wherein said transparent cover means is constructed of glass.

References Cited by the Examiner

UNITED STATES PATENTS

| | | | |
|---|---|---|---|
| 2,911,488 | 11/1959 | Quintas | 179—185 |
| 3,040,138 | 6/1962 | Cobb | 179—185 |

KATHLEEN H. CLAFFY, *Primary Examiner.*

L. A. WRIGHT, *Assistant Examiner.*